United States Patent [19]

Mueller et al.

[11] 4,222,822
[45] Sep. 16, 1980

[54] METHOD FOR OPERATING A NUCLEAR REACTOR TO ACCOMMODATE LOAD FOLLOW WHILE MAINTAINING A SUBSTANTIALLY CONSTANT AXIAL POWER DISTRIBUTION

[75] Inventors: Norman P. Mueller, Level Green; Charles E. Rossi; Lawrence R. Scherpereel, both of Monroeville, all of Pa.

[73] Assignee: Westinghouse Electric Corp., Pittsburgh, Pa.

[21] Appl. No.: 760,490

[22] Filed: Jan. 19, 1977

[51] Int. Cl.² ............................................. G21C 7/00
[52] U.S. Cl. .................................. 176/20 R; 176/24
[58] Field of Search .................... 176/20, 22, 24, 50

[56] References Cited

U.S. PATENT DOCUMENTS

| | | | |
|---|---|---|---|
| 2,989,453 | 6/1961 | Esselman et al. | 176/20 R |
| 3,070,536 | 12/1962 | Taylor et al. | 176/20 R |
| 3,145,149 | 8/1964 | Imhoff | 176/20 R |
| 3,247,069 | 4/1966 | Powell et al. | 176/20 R |
| 3,276,965 | 10/1966 | Leyse | 176/22 |
| 3,423,285 | 1/1969 | Curry et al. | 176/20 R |
| 3,630,839 | 12/1971 | Podolsky | 176/20 R |
| 3,700,552 | 10/1972 | Schluderberg | 176/20 R |
| 3,799,839 | 3/1974 | Fischer et al. | 176/20 R |
| 3,920,513 | 10/1975 | Loose et al. | 176/20 R |
| 3,998,693 | 12/1976 | Musick | 176/20 R |

FOREIGN PATENT DOCUMENTS

880489   4/1960   United Kingdom ................... 176/20 R

OTHER PUBLICATIONS

Introduction to Nuclear Reactor Theory, (1966), Addison-Wesley, N.Y., J. L. Lamarsh, pp. 448-451.
Nuclear Technology, vol. 21, (3/74), pp. 165-189, Practical Xenon Spatial Control.
Nuclear Technology, vol. 31, (10/76), pp. 12-31.
A New Part Length Control Rod Design for PWR's, Humphries et al., (10/16-21/75), pp. 1-6.
S 2640 0037, Love, (10/4-6/70), pp. 408-411.

*Primary Examiner*—Samuel W. Engle
*Assistant Examiner*—S. A. Cangialosi
*Attorney, Agent, or Firm*—D. C. Abeles; Z. L. Dermer

[57] ABSTRACT

This invention provides a method of operating a nuclear reactor having a negative reactivity moderator temperature coefficient with the object of maintaining a uniform and symmetric Xenon distribution above and below substantially the center of the core over a substantial axial length of the core during normal reactor operation including load follow. In one embodiment variations in the Xenon distribution are controlled by maintaining a substantially symmetric axial power distribution. The axial offset, which is employed as an indication of the axial power distribution, is maintained substantially equal to a target value, which is modified periodically to account for core burnup. A neutron absorbing element within the core coolant, or moderator, is employed to assist control of reactivity changes associated with changes in power, with the full-length control rods mainly employed to adjust variations in the axial power distribution while the part-length rods remain completely withdrawn from the fuel region of the core. Rapid changes in reactivity are implemented, to accommodate corresponding changes in load, by a controlled reduction of the core coolant temperature. Thus, active core coolant temperature control is employed to control the reactivity of the core during load follow operation and effectively increase the spinning reserve capability of a power plant without altering the axial power distribution.

7 Claims, 16 Drawing Figures

METHOD FOR OPERATING A NUCLEAR REACTOR TO ACCOMMODATE LOAD FOLLOW WHILE MAINTAINING A SUBSTANTIALLY CONSTANT AXIAL POWER DISTRIBUTION

BACKGROUND OF THE INVENTION

This invention pertains generally to the control of core operation of nuclear reactor and more particularly, to the control of the axial power distribution and core power level of a nuclear reactor having a negative reactivity moderator temperature coefficient.

Generally, nuclear reactors contain a reactive region commonly referred to as the core in which sustained fission reactions occur to generate heat. The core includes a plurality of elongated fuel rods comprising fissile material, positioned in assemblies and arranged in a prescribed geometry governed by the physics of the nuclear reaction. Neutrons bombarding the fissile material promote the fissionable reaction which in turn releases additional neutrons to maintain a sustained process. The heat generated in the core is carried away by a cooling medium, which circulates among the fuel assemblies and is conveyed to heat exchangers which in turn produce steam for the production of electricity.

Commonly in pressurized water reactors a neutron absorbing element is included within the cooling medium (which also functions as a moderator) in controlled variable concentrations to modify the reactivity and thus the heat generated within the core, when required. In addition, control rods are dispersed among the fuel assemblies, longitudinally movable axially within the core, to control the core's reactivity and thus its power output. Generally, in the past in pressurized water reactors there have been three types of control rods that have been employed for various purposes. Full-length rods, which extend in length to at least the axial height of the core, are normally employed for reactivity control. Part-length control rods, which have an axial length substantially less than the height of the core, are normally used for axial power distribution control. In addition, reactor shutdown control rods are provided for ceasing the sustained fission reaction within the core and shutting down the reactor. The part-length rods and full-length rods are arranged to be incrementally movable into and out of the core to obtain the degree of control desired.

As a by-product of the fission reaction, through a process of $\beta$ decay of radioactive iodine, Xenon is created. Xenon has the property of having a large neutron absorption cross-section and therefore has a significant effect on the power distribution within the core and reactivity control. While the other forms of reactivity management are directly responsive to control, the Xenon concentration within the core creates serious problems in reactor control in that it exhibits a relatively long decay period and requires up to at least 20 hours after a power change to reach a steady state value.

While the radial power distribution of the core is fairly uniform, due the prescribed arrangement of fuel assemblies and the positioning of control rods which are symmetrically situated radially throughout the core, the axial power distribution can vary greatly during reactor operation. The axial power distribution of the core can create many problems throughout the course of reactor operations. Normally coolant flow through the fuel assemblies is directed from a lower portion of the core to the upper core regions, resulting in a temperature gradient axially along the core. Changes in the rate of the fission reaction, which is temperature dependent, will thus vary along the axis of the core. Secondly, the axial variation in the power distribution varies the Xenon axial distribution, which further accentuates the variations in the power axially along the core. Thirdly, insertion of the full length control rods from the top of the core, without proper consideration of the past operating history of the reactor can add to the axial power asymmetry.

The change in reactor core power output which is required to accommodate a change in electrical output of an electrical generating plant is commonly referred to as load follow. One load follow control program currently recommended by reactor vendors utilizes the movement of the full-length control rods for power level increases and decreases and the part-length control rods to control axial oscillations and shape the axial power profile. Changes in reactivity associated with changes in the Xenon concentration are generally compensated for by corresponding changes in the concentration of the neutron absorbing element in the core coolant or moderator. In this mode of operation, the part-length rods are moved to maintain the axial offset within some required band, typically plus or minus fifteen percent. The axial offset is a useful parameter for measuring the axial power distribution and is defined as:

$$A.O. = (P_t - P_b)/P_t + P_b)$$

where $P_t$ and $P_b$ denote the fraction of power generated in the top half and the bottom half of the core respectively. Under such a load follow program, no effort is made to maintain the inherent core axial power profile. The part-length rods are moved to minimize and reduce the axial offset independent of the previously established steady state axial offset. This process induces a constant fluctuation of the axial offset during sustained load follow operations which results in a number of undesirable operating conditions. For one thing, power pinching, which is a large axially centered power peak, is likely to occur. Such power peaks result in a reactor power penalty which requires the reactor to be operated at a reduced power level so that such peaks do not exceed specified magnitudes. Secondly, severe changes occur in the axial power profile of a transient nature during large load changes due to heavy insertion of control rods at reduced power levels. Thirdly, large Xenon transients occur upon coming back to power resulting in occurrences such as axial power oscillations. Fourthly, the part-length rod broad operating instructions supplied by reactor manufacturers are generally vague and require anticipation and interpretation by the reactor plant operator. Fifthly, increased hot channel factors result (which are hot spots which occur within the cooling channels among the fuel assemblies) and require a reduction in the power rating of the reactor to accommodate severe transients and/or adverse power profiles. Under such load follow programs no protection exists against severe pinching with small axial offsets.

A new method of operation for a nuclear reactor, described in application Ser. No. 501,569, filed Aug. 29, 1974, has been proposed to avoid the aforegoing adverse operating characteristics. The proposed method maintains a substantially symmetric Xenon axial profile during normal reactor operation including load follow.

Normal operation generally excludes startup of the reactor and reactor shutdown and is normally interpreted to include the power operating range of the reactor in response to load requirements. Implementation of the desired Xenon distribution in accordance with this method is obtained by monitoring the power generated in the core at a first and second axial location. The core power parameters measured at the two locations are computed in accordance with a predetermined relationship such as the axial offset to give a value indicative of the axial power distribution of the core. The reactivity control mechanisms of the reactor are manipulated in accordance with the monitored values to maintain a substantially symmetric power distribution within the core throughout reactor operation under power including load follow.

Two separate embodiments have been taught for maintaining the desired axial power distribution prescribed by this new method of reactor operation. In the first, the part-length control rods remain withdrawn from the core while the neutron absorbing element within the core coolant is employed to assist adjustment of the reactivity of the core to correspond to changes in output power requirements and the full-length control rods are manipulated to maintain the desired axial power profile. In the second embodiment, the full-length control rods are used to control the reactivity changes associated with changes in power in the core and the part-length rods are employed to control the axial power distribution, while the neutron absorbing element within the core coolant compensates for reactivity changes due to Xenon buildup or depletion. Each embodiment is capable of implementing the concepts of the method and each has its respective distinct advantages. For example, the operation with part-length control rods has certain advantages over operation without part-length control rods such as the ability to provide quick changes in output power and the easiness of axial offset control. One disadvantage of part-length rod operation is the burn-up shadowing that results when the part-length rods are positioned near the middle of the core during full power operation. Because part-length rods act as neutron absorbers, the fuel screened by the part-length rods depletes at a much lesser rate than the remaining core. This could result in high peaking near the center of the core when the part-length rods are withdrawn, if extended load operation is performed. Burn-up shadowing has become the subject of a growing concern and the use of part-length rods are being discouraged. Alternatively, operation without part-length rods, while desirable from a fuel efficiency standpoint, exhibits a relatively slow return to power capability in response to an increase in load. The rate of a power increase during operation without part-length rods is dependent upon the dilution rate of the neutron absorbing element within the coolant, which in the case of pressurized water reactors is boron. Presently, operating nuclear reactors employ ion exchange or coolant replacement systems to control the boron concentrations within the coolant. These systems typically have a relatively slow response time.

Accordingly, an improved method of operation of a nuclear reactor is desired that will increase the load follow capability of nuclear power plants to accommodate rapid excursions in load requirements.

SUMMARY OF THE INVENTION

Briefly, this invention improves the load follow capability of nuclear reactors having a negative, reactivity, moderator temperature coefficient, operating with a substantially constant axial offset and with or without part-length control rods, by accommodating requirements for increases in reactivity within the core above and beyond the dilution capabilities of the boron system with a controlled reduction in the core temperature. Desirably, the temperature of the core is reduced at a rate compatible with the rate of increase of the load requirements to a pre-established maximum temperature difference from the programmed operating temperature of the reactor. In addition, withdrawal of the full-length control rods above a level that will adversely alter the desired axial offset is inhibited.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
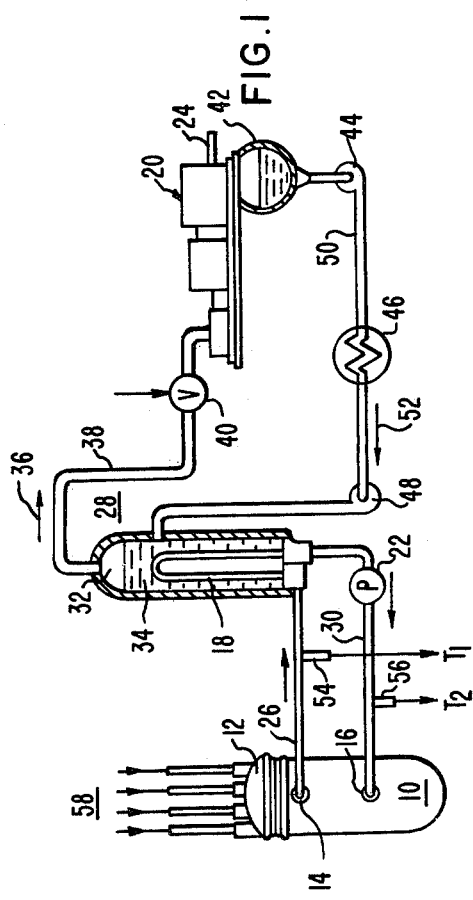
FIG. 1 is a schematic illustration of a nuclear reactor power generating facility.

FIG. 1 shows a schematic representation of a typical pressurized water reactor which can employ the method of this invention to avoid the operating difficulties experienced by the prior art while maintaining a full load follow capability. The reactor of FIG. 1 includes a vessel 10 which forms a pressurized container when sealed by its head assembly 12. The vessel has coolant flow inlet means 16 and coolant flow outlet means 14 formed integral with and through its cylindrical walls. As is known in the art, the vessel 10 contains a nuclear core of the type previously described, consisting mainly of a plurality of clad nuclear fuel elements which generate substantial amounts of heat depending primarily upon the position of the control rods previously described. The heat generated by the reactor core is conveyed from the core by coolant flow entering through inlet means 16 and exiting through outlet means 14. Generally, the flow exiting through outlet means 14 is conveyed through an outlet conduit 26 to a heat exchange steam generator system 28, wherein the heated coolant flow is conveyed through tubes, schematically illustrated by reference character 18, which are in heat exchange relationship with water which is utilized to produce steam. The steam produced by the generator 28 is commonly utilized to drive a turbine 20 for th production of electricity. The flow of the coolant is conveyed from the steam generator 28 by the pump 22 through a cool leg conduit 30 to the inlet means 16. Thus a closed recycling primary or steam generating loop is provided with the coolant piping coupling the vessel 10 and the steam generator 28. The vessel shown in FIG. 1 is illustrated with one such closed fluid flow system or loop though it should be understood that the number of such loops vary from plant to plant and commonly two, three, or four are employed. Though not shown in the loop illustrated in FIG. 1, one loop of each plant includes a pressurizer which is responsive to the onset of a variation in pressure within the primary system due to temperature changes and variations in other operating conditions, to maintain a substantially constant primary pressure.

The secondary side of the steam generator is isolated from the primary coolant by the heat exchange tubes 18. In the steam generator the secondary fluid 34 is placed in heat exchange relationship with the primary coolant, where it is heated and converted to a vapor or steam. The vapor flows through a steam conduit 38, as denoted by the arrow 36, to a turbine 20 which is connected via shaft 24 to a load, for example, an electrical generator. The amount of steam exhausted to the turbine is controlled by a throttling valve 40. The steam after passing through the turbine 20 is condensed in a condenser 42. The condensate or water thus formed is returned to the secondary or shell side of the steam generator through conduits 50, condensate pump 44, feedwater heater 46, and feedwater pump 48 as denoted by flow arrow 52. Thus, a recycling secondary electrical generating system is provided with the secondary fluid piping coupling the steam generator 28 to the turbine 20.

The coolant temperatures in the reactor outlet conduit 26 and the reactor inlet conduit 30 for each of the primary loops of a typical pressurized water reactor system such as the one illustrated in FIG. 1 is sensed by temperature measuring elements 54 and 56, respectively, each of which may comprise a thermocouple or temperature resistance bulb. The temperature measuring elements 54 and 56 produce output signals $T_1$ and $T_2$, respectively, representative of the instantaneous temperature at the measuring location. The $T_1$ and $T_2$ signals for each loop are applied to a temperature averaging unit and the respective averages from the several loops are auctioneered to identify the highest instantaneous average operating temperature of the reactor. The identified operating temperature is then compared to a reference which is commonly a programmed function of the load. Presently, when the instantaneous identified temperature of the reactor departs from the programmed reference an error signal is generated which controls movement of the control rods in the direction to minimize the error. Accordingly, a programmed average temperature, reactor following load mode of operation is normally employed such as is described in U.S. Pat. No. 3,423,285 to C. F. Currey et al.

Upon an increase in load demand the plant operator opens the throttling valve 40 to the turbine 20 until the desired output is attained. The increased steam flow rate exhausted to the turbine lowers the secondary pressure and enhances heat removal from the primary coolant. The corresponding drop in primary coolant temperature that would otherwise occur is avoided through manipulation of the control rods 58 in response to the control signals obtained from the programmed average temperature control system (i.e., described in the Curry et al patent).

Various average temperature control programs have been recognized in the art. For example, one of the early programs maintained the coolant in the primary loop at a constant temperature over the entire load range of the nuclear reactor. For a given nuclear reactor this type of operating program enables the nuclear plant full load rating to be closer to the safe operating limits of the reactor. This results from the fact that one of the limiting parameters of the reactor is the coolant temperature, because thermal-hydraulic considerations require that the permissible power output of the reactor be reduced as coolant temperature is increased. Furthermore, electrical load transients on a nuclear reactor plant, for example, a sudden increase in turbine generator load from 90% to 100%, may readily result in a transient overloading of the reactor up to 5% in excess of the 100% rated load. With a constant average temperature control program, the coolant temperature increase is minimized during such a transient. Thus, the plant full load rating can be specified closer to the safe operating limit of the reactor than for a program temperature type of control which normally permits an increase in temperature during such an overload. With this type of temperature control the primary coolant temperature is independent of plant loading with the result that little or no volume change occurs in the primary coolant with changes in load. Therefore, the pressurizer coupled to the primary loop can be made relatively small, since it may be sized for transient conditions only.

However, the disadvantage of using a constant temperature control over the entire load range is that it results in a characteristic rise in secondary loop pressure at light loads. At light loads the mean temperature differential between the tube and shell side of the steam generator falls to a low value as the secondary fluid temperature rises to a value close to that of the primary coolant temperature. This rise in secondary fluid temperature causes a corresponding rise in secondary fluid pressure. Therefore, for a given full load steam pressure the secondary loop must be designed for pressures much higher than the pressures encountered at full load operating level. Obviously the requirement of the higher design pressure results in a large and undesirable increase in the capital cost of the steam generator and other components utilized in and around the secondary loop. Graph A of FIG. 6 illustrates such a constant average temperature program with the corresponding variation in steam pressure versus power illustrated by Graph A in FIG. 7.

Figure 6:
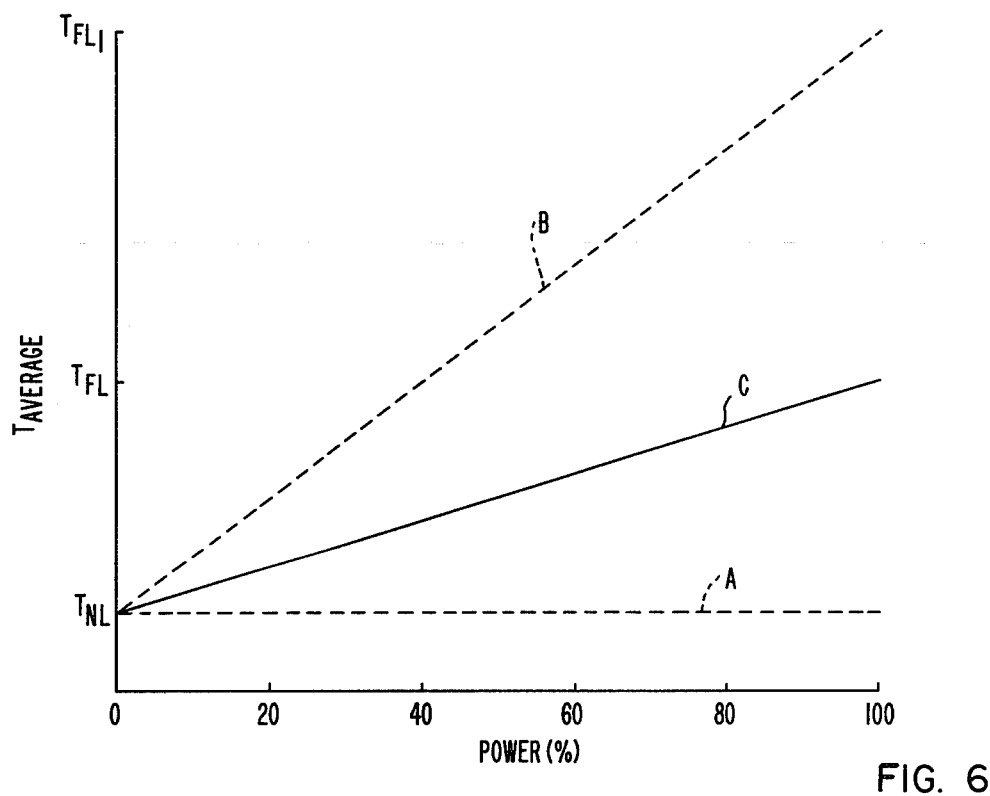
FIG. 6 is a graphical illustration of three variations that can be employed in the average temperature programming of the primay coolant of a nuclear reactor to control reactor operation.
Figure 7:
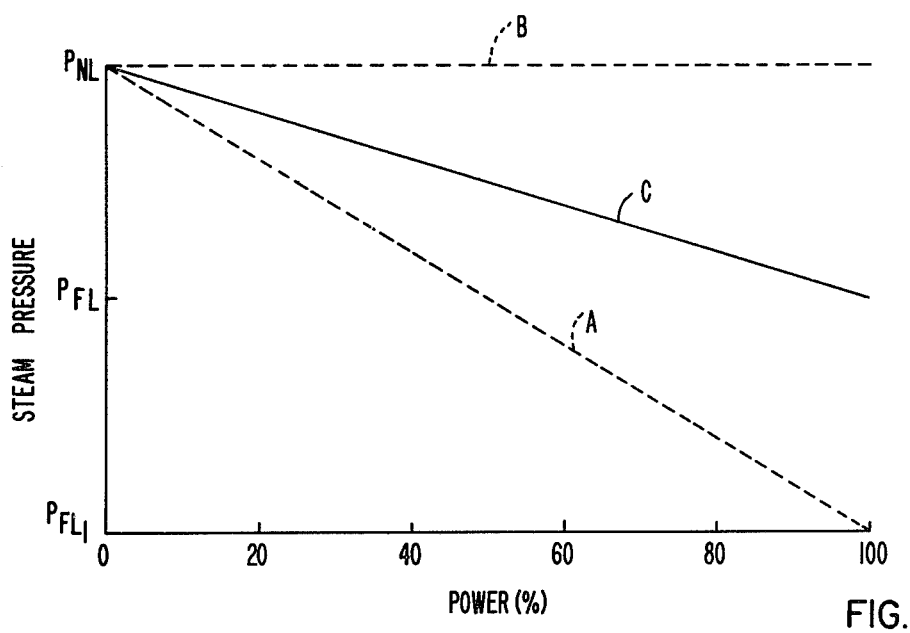
FIG. 7 is a graphical illustration of the variations that can occur in steam pressure versus power, corresponding to the average temperature programs of FIG. 6.

Alternatively, if a constant steam pressure program is employed as illustrated by Graph B in FIG. 7, large primary temperature excursions are encountered as illustrated by Graph B in FIG. 6, which would necessitate an enlarged pressurizer with its attendent costs and other disadvantages. The variable average temperature program illustrated by Graph C in FIG. 6 and its corresponding steam pressure response identified by Graph C in FIG. 7 is a compromise and provides the most efficient operating condition for normal power operations as is described in the Currey et al patent.

Figure 3:
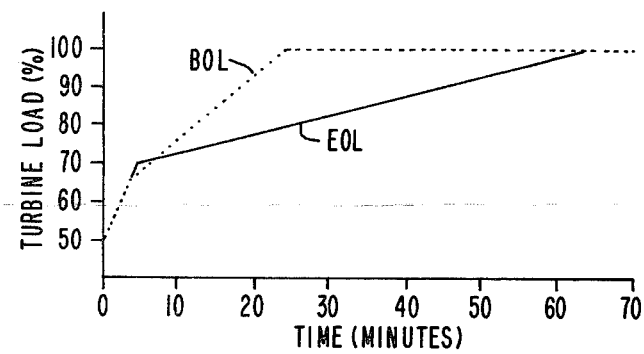
FIG. 3 is a graphical illustration of the capable rate of increase of turbine output in response to a requirement for a load increase, at beginning of life and end of core life, for a typical nuclear reactor generating facitility employing state of the art average temperature control and constant axial offset control without part-length rods.

Implementation of constant axial offset control without use of part length control rods to maintain the most desirable operating conditions within the reactor to avoid power penalties alters the standard practice of using the full length control rods to achieve the desired rate of reactivity change to maintain the instantaneous average temperature essentially equal to the programmed average temperature. The full length control rods under constant axial offset control without part length rods are employed to maintain the axial offset substantially equal to a target value. Variations in power are now accommodated by varying the concentration of the neutron absorbing element within the coolant. In pressurized light water reactors, the hydrogen within the coolant acts as a moderator to slow down the neutrons created in the fissioning process to an energy level most likely to sustain the fission chain reactions occurring within the core. Boron is commonly employed in such reactors as the neutron absorbing element within the coolant. The boron concentrations are generally controlled through an ion exchange or dilution process which are typically slow and generally deteriorate in effectiveness from the beginning of life to the end of life of the core. However, the system is effective to accommodate most changes in load without disturbing the axial power distribution of the core. FIG. 3 illustrates the ability of both the full-length control rod system and the boron system to accommodate an increase in turbine load as a function of time for both the beginning of life (BOL) and end of life (EOL) of a typical nuclear core. Requirements for faster changes in load have been accommodated in the past by the fossil fuel plants on the electrical grid.

This invention provides an improved method of operating a nuclear reactor which maintains the procedure specified by constant axial offset control, but provides an increased capability to respond to load increase requirements and overcomes the limitations of the dilution capabilities of the boron systems. To accomplish this end this invention takes advantage of the negative reactivity moderator temperature coefficient characteristic of light water pressurized reactors to achieve a rapid increase in reactivity by a controlled reduction in the primary loop temperature.

Figure 4:
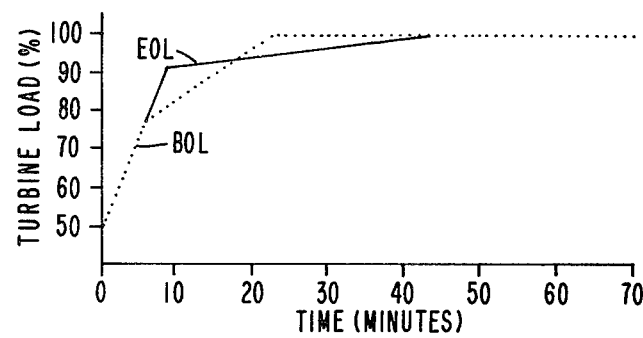
FIG. 4 is a graphical illustration of the rate of turbine output power increase that can be obtained employing this invention.

Rapid return to power during load follow employing constant axial offset control without part length rods is limited because of the shallow control rod insertion necessitated to maintain the desired axial flux pattern in the core. Considerable improvement in return to power capabilities is obtained by taking advantage of any available excess throttle valve capacity and by reducing primary coolant temperature during load transient increases. The amount of reactivity increase depends upon the size of the temperature drop achieved in the primary loop and on the magnitude of the negative moderator coefficient. Excess throttle valve capacity (available on most reactors) allows higher power levels at reduced steam pressures. FIG. 4 illustrates the power level obtainable at 5%/minute (from 50% power) at BOL and EOL corresponding to the control rod reactivity insertion assumed for FIG. 3. A throttle valve capacity of 105% (typical) of nomial has been assumed in each case. A comparison of the two results illustrates the increase in load follow capability provided by the method of this invention.

In accordance with this invention in response to an increase in power output requirement necessitated by an increase in load, the turbine throttle valve 40 is loaded (opened) at the desired rate of increase (e.g., 5%/minute). At the same time boron dilution is effected at the maximum rate available. Loading of the turbine as explained previously will effect a reduction in the average instantaneous core coolant temperature which will effect automatic withdrawal of the full length control rods through the average temperature control system. The axial flux difference, which is the difference in flux monitored in the upper and lower regions of the core, is identified and the automatic withdrawal of the full length control rods are stopped if and when the axial flux difference reaches its upper (most positive) control band limit corresponding to its target value (set by the constant axial offset specifications). The primary coolant temperature will begin to drop as soon as the control rods are stopped or, if the flux difference control limits are not approached, when the control rods reach their withdrawal limit at the top of the core. The instantaneous average primary coolant temperature is constantly monitored. If and when the difference between the instantaneous average primary coolant temperature and the programmed coolant temperature specified by the average temperature control system reaches a maximum pre-established value, typically 20° F., the turbine loading is stopped to prevent further temperature reduction. In practice some rate/lag compensation is employed to allow for the thermal inertia of the system. The maximum temperature limit is set to prevent a reactor trip that would otherwise result from the system interpreting the temperature drop as a steam generator line break. If the pre-established temperature limit is reached and the turbine loading is stopped, then the actual to programmed coolant temperature difference will be reduced as a result of the boron dilution in effect. In most instances a 20° F. drop in temperature will provide the desired power increase. If not, the turbine is loaded and stopped as specified above until the throttle valve is fully opened. From this point the rate of power increase is controlled by the boron dilution rate. This latter phase has assumed that the desired power output has not been reached at some intermediate point. The boron dilution operation is stopped when the turbine is at the desired power and the coolant temperature has reached its program value specified by the average coolant temperature control system. Any excess throttle valve capacity utilized is cut back automatically upon reaching full power by the current turbine controllers.

The steps of this method apply to any starting power level during power operation and any set of normal operating conditions. The power level achieved at the accelerated return to power rate depends primarily on the starting power level, core cycle (equilibrium or not), core cycle lifetime, power rate, and temperature reduction permitted. It should be appreciated of course that the values specified are typical but may vary to some degree from plant to plant depending upon the particular plant's operating specifications.

Figure 5:
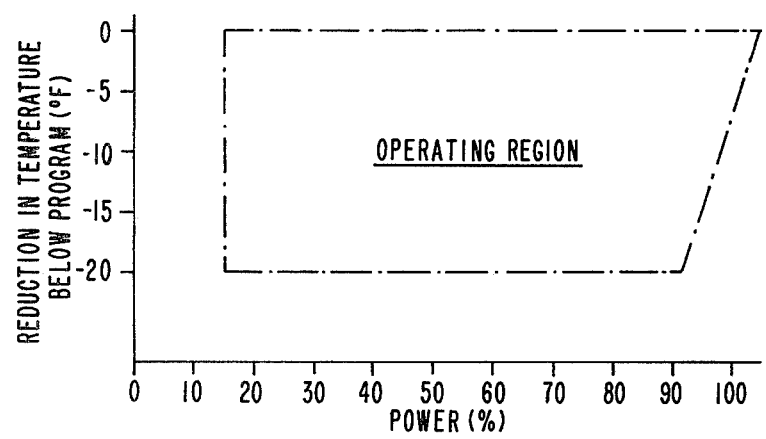
FIG. 5 is a graphical illustration of the reduced temperature operating region during return to power, employing the method of this invention.

The amount of power (reactivity) that can be obtained by reducing the primary coolant temperature is proportional to the drop in temperature permitted. However, there are practical limits to the amount of temperature drop that can be obtained. FIG. 5 shows a typical reduced temperature operating region for a light water pressurized reactor. The left boundary of the operating region is defined by the lower operating limit of the automatic rod control system and by the reactor cool-down protection trips. The right boundary is governed by the throttle valve capacity (a function of steam temperature/pressure). The right boundary shown in FIG. 5 assumes a throttle valve capacity of 105% of full power. Excess throttle valve capacity of 105 to 110% exists in most operating nuclear facilities. The lower boundary of the operating region is defined by reactor cool-down protection trip settings, reactor vessel and other plant component thermal stresses, and by steam generator moisture carry-over considerations.

Figure 2:
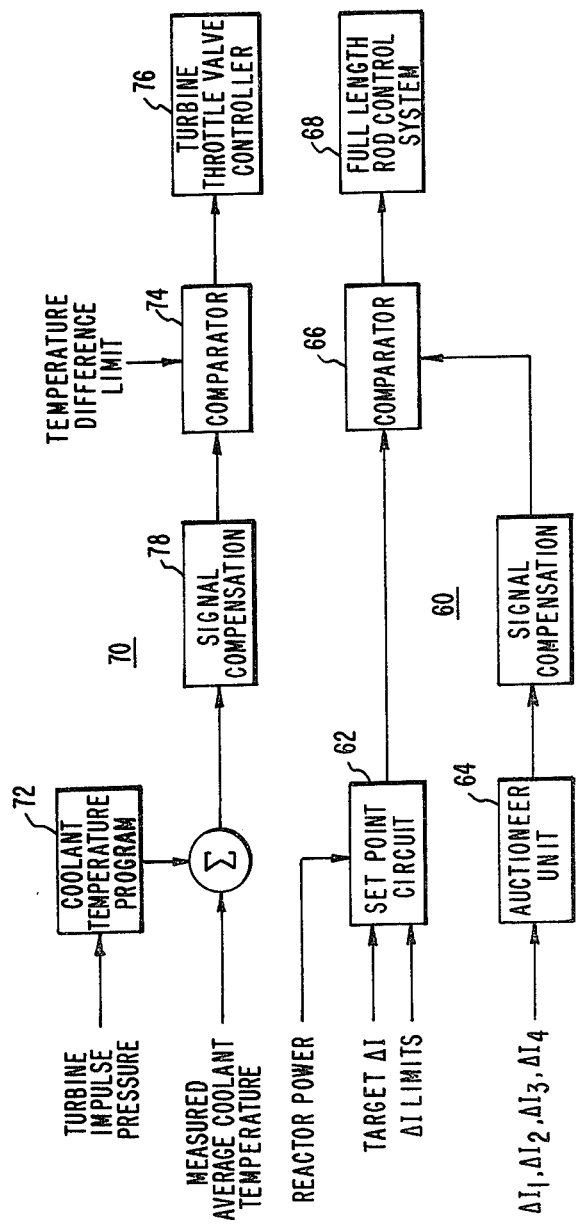
FIG. 2 is a block diagram of exemplary control systems which can be employed to implement the steps of this invention.

The method of this invention is compatible with the average program temperature control operation described in the aforecited Currey et al patent. For constant axial offset control without part-length control rods the only modification required is that temperature adjustments in the instantaneous average of the core coolant be accomplished by boron dilution rather than control rod movement. The block diagram circuit generally illustrated by reference character 60 in FIG. 2 is capable of implementing the necessary modifications. The target band for the flux limits which is a function of reactor power is programmed into a setpoint circuit 62. The flux difference between the upper and lower regions of the core is monitored by four sets of neutron detectors positioned around the periphery of the reactor. The worst value monitored for the flux difference is identified by an auctioneering unit 64. The worst case flux difference is compared to the setpoint generated by the circuit 62 by a comparator 66. If the setpoint is exceeded an inhibit signal is issued to the full length rod control system to prevent further withdrawal of the control rods. Similarly, the temperature difference limit inhibit is implemented by the block circuitry illustrated by reference character 70. The measured average coolant temperature is compared with the coolant temperature programmed value, which is a function of the load as represented by the turbine impulse pressure input to the programming unit 72. The magnitude of the difference between the measured average coolant temperature and the program temperature is communicated to the comparator 74 which compares the signal to the temperature difference setpoint. If the setpoint is exceeded, further loading of the turbine throttle valve is inhibited by the controller 76. Signal compensation 78 is supplied in the form of rate/lags to compensate for the thermal inertia of the system. Accordingly, the average temperature control system presently in operation is easily modified to perform the steps of this invention to improve load follow capability during constant axial offset operation.

Figure 8:
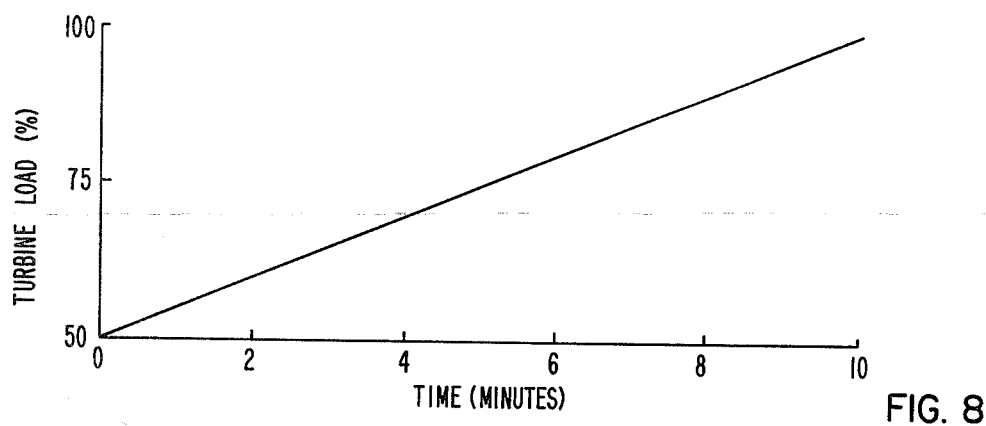
FIG. 8 is a graphical illustration of an exemplary power transient increase obtained employing part-length rod control.
Figure 9:
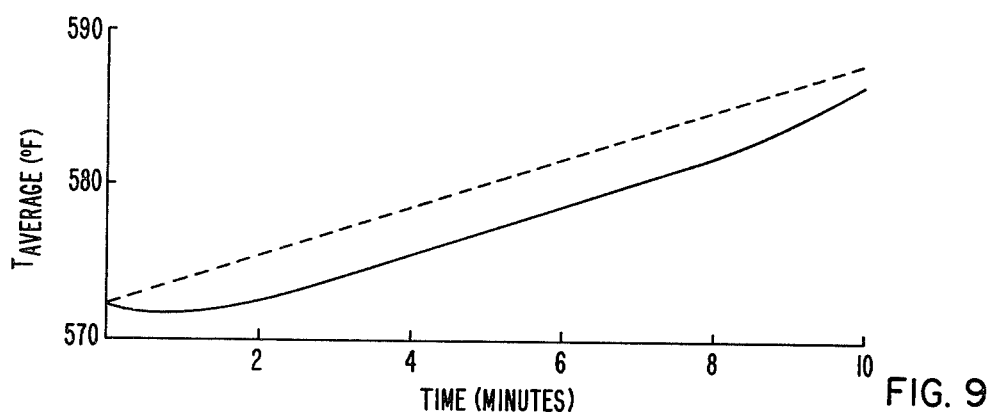
FIG. 9 is a graphical illustration of the average temperature and average temperature program corresponding to the power transient illustrated in FIG. 8.
Figure 10:
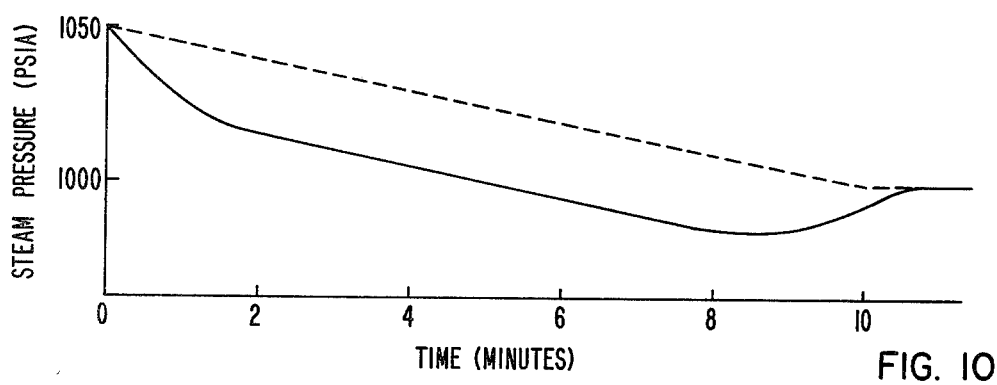
FIG. 10 is a graphical illustration of the steam pressure variation with time corresponding to the power transient illustrated in FIG. 8.
Figure 11:
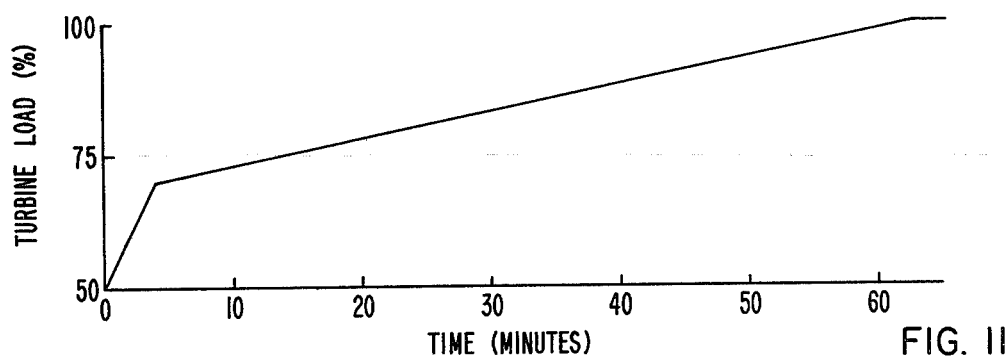
FIG. 11 is a graphical illustration of a rapid return to power transient employing state of the art average temperature control and operation without part-length rods.
Figure 12:
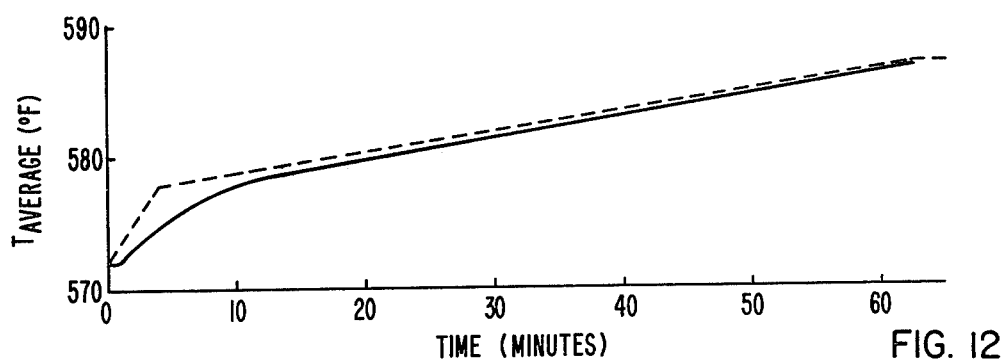
FIG. 12 is a graphical illustration of the average temperature and average temperature program corresponding to the transient illustrated in FIG. 11.
Figure 13:
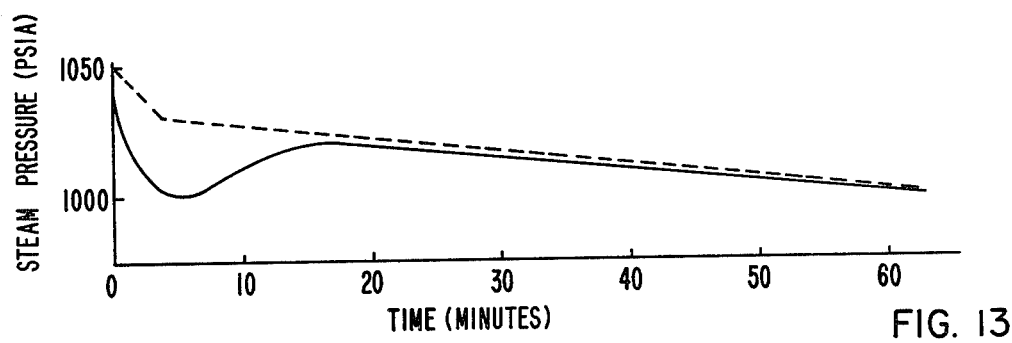
FIG. 13 is a graphical illustration of the variation in steam pressure versus time corresponding to the transient illustrated in FIG. 11.
Figure 14:
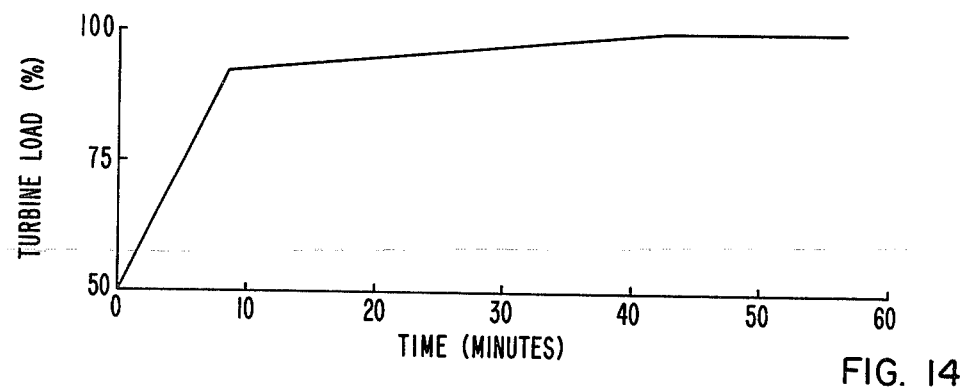
FIG. 14 is a graphical illustration of a rapid return to full power employing the steps of this invention.
Figure 15:
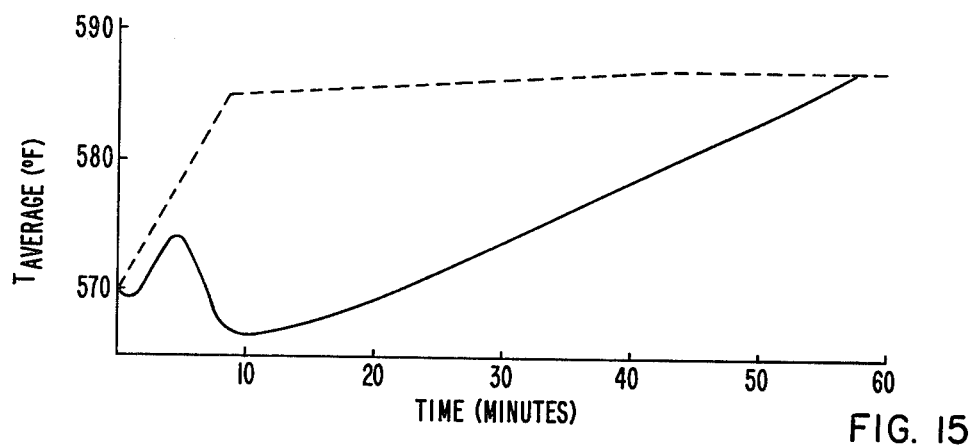
FIG. 15 is a graphical illustration of the average temperature program corresponding to the transient of FIG. 14.
Figure 16:
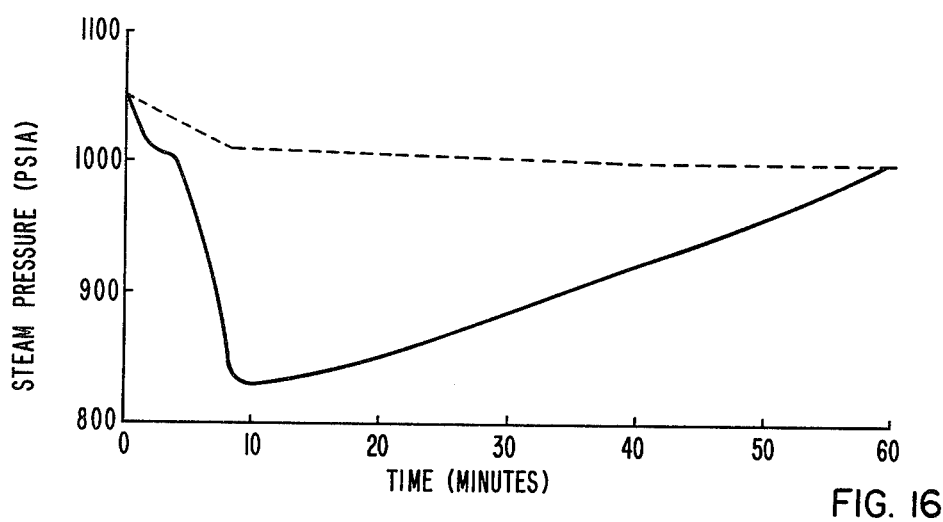
FIG. 16 is a graphical illustration of variations in steam pressure versus time corresponding to the power transient illustrated in FIG. 14.

FIGS. 14, 15 and 16 illustrate a corresponding change in plant conditions on a rapid return to power employing the reduced average temperature control method of this invention. The dotted portion of the curve illustrated in FIG. 15 identifies the average temperature control program while the solid portion of the curve indicates the departure achieved employing the steps of this invention. The dotted and solid portions of FIG. 16 respectively correspond to the operating conditions identified in FIG. 15. In contrast, FIGS. 8, 9 and 10 correspondingly show an exemplary return to power at a rate of 5%/minute from 50% power, which is equivalent to the full spinning reserve capability from 50% power. The dotted lines in FIGS. 9 and 10 indicate program values and the solid lines correspond to operating conditions. The spinning reserve is the difference between the current operating power level of the plant and the power level that can be achieved in the event of a sudden large demand in power. The transient illustrated in FIG. 8 is not possible without operation with part length rods as the control rods are not inserted into the core far enough to accommodate such a change by their withdrawal. However, if the axial power distribution is not considered, such a transient can theoretically be produced. FIGS. 11, 12 and 13 illustrate the capacity to achieve full power under constant offset control without part length control rods. The dotted and solid portions of the graph correspond respectively to the programmed and actual operating conditions experienced. The operating characteristics illustrated are compatible with the end of life data illustrated in FIG. 3. Only 70% of power is achievable at a load increase rate of 5%/minute. Accordingly, the increase in load follow capability achieved in accordance with this invention can be appreciated.

We claim:

1. A method of operating a pressurized water nuclear reactor steam generation system having a reactive core including fissile material with an axial dimension, means for controlling the axial power distribution of the core, a coolant medium and moderator for respectively removing heat from the core and slowing down neutrons in the core for fissioning, the moderator having a negative reactivity temperature coefficient, a primary coolant loop for conveying the coolant medium to a heat exchanger steam generator and a secondary loop for conveying the steam generated to a steam utilization device, including the steps of:
   maintaining a substantially symmetric power distribution axially throughout the core during normal reactor power operation including load follow;
   operating the steam generator completely below the superheated steam region throughout normal power operation, including load follow; and
   increasing the reactivity within the core and the reactor's power output without substantially altering the axial power distribution of the core, upon a given demand, by reducing the average temperature within the core, during normal reactor power operation including load follow, while maintaining a substantially constant primary coolant flow rate.

2. The method of claim 1 wherein the coolant medium is circulated into and out of the core and through a heat exchanger in a closed recycling primary system wherein the heat exchanger places the coolant medium in heat exchange relationship with water to form steam which is conveyed through a throttling valve to an exhaust and wherein the temperature of the core is reduced by increasing the amount of heat removed from the coolant medium through the heat exchanger to produce steam by increasing the amount of steam exhausted by opening the throttling valve.

3. The method of claim 2 including the step of preventing the temperature of the core from being reduced below a preselected value by limiting the opening of the throttling valve.

4. The method of claim 3 wherein the preselected value is twenty degrees Fahrenheit below the normal operating temperature of the coolant.

5. The method of claim 1 wherein the means for controlling the axial power distribution of the core includes control rods extending axially for at least the axial length of the core and movable axially into and out of the core and wherein the axial power distribution is represented by the difference in flux generated in the upper and lower halves of the core, including the step of maintaining the difference in flux generated in the upper and lower halves of the core substantially constant throughout reactor power operation by the axial positioning of the control rods.

6. The method of claim 5 including the step of preventing the control rods from being withdrawn from the core when the flux difference substantially exceeds a pre-established value.

7. The method of claim 1 wherein the coolant medium includes a neutron absorbing element wherein the reactivity increasing step further includes diluting the neutron absorbing element within the coolant medium.

* * * * *